No Printed Specification Available

8212X

L. Burnell,

Steam-Boiler Water-Tube.

Patented May 21, 1834.

N. PETERS, PHOTO-LITHOGRAPHER, WASHINGTON, D. C.

Levi Burnell of Elyria, Ohio 8212X
Letters Patent

The schedule referred to, in these Letters patent and making part of the same, containing a description in the words of the said Levi Burnell himself, of his improvement in the construction of Boilers for generating Steam.

Figure 1:
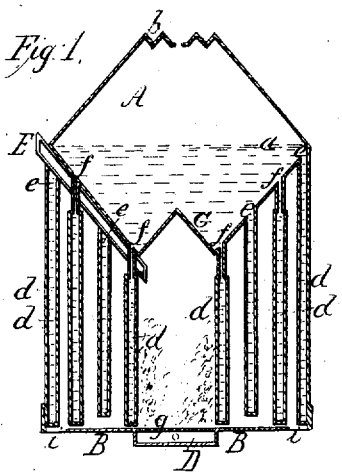
Figure 2:
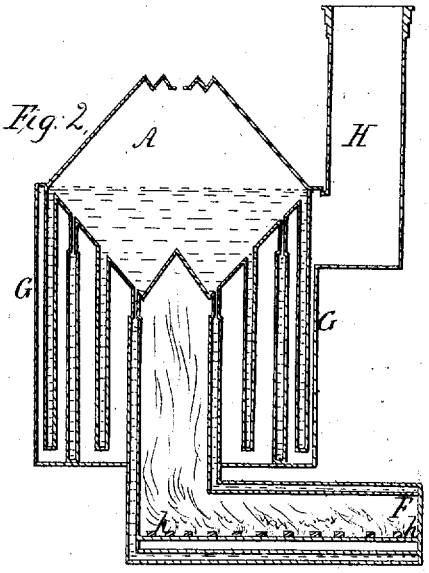
Figure 2:
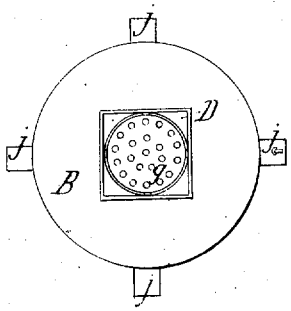
Figure 2:
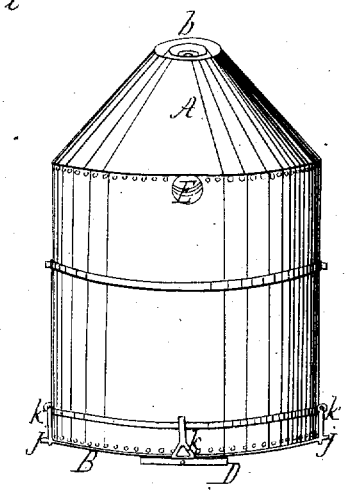
Figure 2:
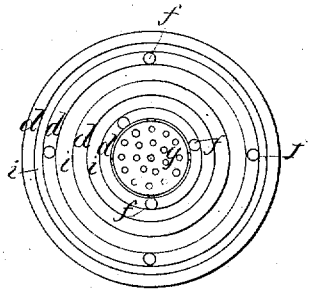

To all to whom these presents shall come: Be it known that I, Levi Burnell of Elyria, in the County of Lorain, and State of Ohio, have invented a new and useful improvement in the construction of Boilers for generating steam and that the following is an exact and full description of the construction of the same as invented or improved by me. The steam chamber A. is formed in shape like a double cone united at a common base, in the line of a horizontal plane a, the apex of the upper section b. being depressed, and that of the lower section c. inverted. To this double conical steam chamber and beneath the same, are attached vertically an indefinite series of concentric cylindrical boilers dddd, every other one being attached closely to, and communicating by openings or tubes e, with the steam chamber, and separated from the hearth B, while the alternates rest upon the hearth B. and communicate with the steam chamber, by a number of tubes or pipes f. extending from the top of each alternate boiler to and within the steam chamber. The concentric cylinder boilers dddd, are formed each of an exterior and interior cylinder or hoop, so united by rivets at each end or top or bottom, with a bar or rim between the two as to present their contents in a stratum of any desired capacity. The furnace or fire place C. is directly beneath the centre of the steam chamber, and is circumscribed by the interior plate or hoop of the interior cylinder a grate g with an ash pit D, is placed beneath the same, and so constructed as to admit of an artificial blast or the free ingress of atmospheric air, from the grate and and on the same plane beneath the surrounding boilers, except the exterior one is the hearth B. attached in such a manner as to be capable of letting off at pleasure for the purpose of cleansing repairing &c. The whole to be constructed of iron, copper, or both or of such other material as in the Drawing judgment of the builder shall be deemed most suitable and of such dimensions and proportions according to the power desired or purposes to which applied or fuel used, shall be most expedient. The furnace to be charged (if coal or coke be the fuel in use) by a feeder E. to be introduced over the top of the vertical cylindrical boilers along and beneath the angular line of the nether cone which will conduct and drop the fuel in at the top of the furnace and is to be kept closed except when charging, while through the grate, beneath may be a small tube for the purpose of injecting oil, alcohol, or other combustible fluids or gases calculated to increase the length of the flame. The flame of the united base of the cones in the steam chamber is to be considered the water line and, may be gauged in the usual or most approved manner. The water supplying the boilers may be introduced at the exterior or interior cylinder as shall be thought most advisable, and the steam taken off at the top of the steam chamber by the ordinary conduit. The boilers may be raked through openings in the rim at the bottom of the concentric boilers, to be closed by corresponding sections and keyed in the usual manner of closing manholes in ordinary boilers. When long wood is used for fuel a horizontal fire-place will be necessary and may be introduced into or form a part of the interior cylinder or furnace by adopting an elbow as in fig. 2. letter F. and may also contain throughout a stratum of water, but in adopting this form of fire-place the grate g may be dispensed with, and a grate h. corresponding in length with the horizontal cylinder F. adopted; to be placed within the same so as to make a fire place of it, and to allow of a free circulation of atmospheric air through the mass of fuel. when constructed for a locomotive carriage the gass from the fire may be discharged I at the bottom of the apparatus between the exterior boiler and that which it immediately encloses, but in cases where an elevated flue can be conveniently adopted the whole may be again enclosed by a thin metallic case G. fig. 2. and the smoke and gas discharged in the usual manner. But when the combustion is promoted by an artificial blast, either a horizontal or vertical discharge flue, may conduct the smoke or gas away to the leeward or to any other desired or convenient quarter. Thus constructed the flame or caloric from the furnace or fire place is compelled to ascend & descend both within and without each successive stratum of water to any desired extent until a useless gas, smoke or residuum of low temperature is discharged into open air having imparted its heat to the boilers, and through them to their contents from the necessity of traversing a lengthened distance in close contact with the slightly separated strata of fluid.

Witnesses
Eleazer Day
G. N. Fletcher

Levi Burnell

Exd
W.G.C.

897 wds